(12) United States Patent
Chen et al.

(10) Patent No.: US 12,463,307 B2
(45) Date of Patent: Nov. 4, 2025

(54) BATTERY MODULE, BATTERY PACK, DEVICE AND FAILURE PROCESSING METHOD

(71) Applicant: CONTEMPORARY AMPEREX TECHNOLOGY (HONG KONG) LIMITED, Hong Kong (CN)

(72) Inventors: Xuan Chen, Ningde (CN); Zengzhong Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 843 days.

(21) Appl. No.: 17/489,108

(22) Filed: Sep. 29, 2021

(65) Prior Publication Data

US 2022/0021093 A1 Jan. 20, 2022

Related U.S. Application Data

(63) Continuation of application No. PCT/CN2020/135948, filed on Dec. 11, 2020.

(30) Foreign Application Priority Data

Apr. 3, 2020 (CN) .......................... 202010261036.0

(51) Int. Cl.
*H01M 50/588* (2021.01)
*G01R 31/392* (2019.01)
(Continued)

(52) U.S. Cl.
CPC ........ *H01M 50/588* (2021.01); *G01R 31/392* (2019.01); *H01M 50/204* (2021.01);
(Continued)

(58) Field of Classification Search
None
See application file for complete search history.

(56) References Cited

U.S. PATENT DOCUMENTS

2007/0099073 A1* 5/2007 White ................. H01M 50/509
429/61
2017/0179462 A1 6/2017 Bourns et al.
(Continued)

FOREIGN PATENT DOCUMENTS

CN 202395111 U 8/2012
CN 203787530 U 8/2014
(Continued)

OTHER PUBLICATIONS

Machine translation of CN108199099, Lu (Year: 2018).*
(Continued)

*Primary Examiner* — Jonathan G Leong
*Assistant Examiner* — Taeyoung Son
(74) *Attorney, Agent, or Firm* — Scully, Scott, Murphy & Presser, P.C.

(57) ABSTRACT

Embodiments of the present application relate to a battery module, a battery pack, a device and a failure processing method. The battery module includes: a plurality of battery units for series connection, where after the battery module fails, the plurality of battery units include a failed battery unit and at least one unfailed battery unit adjacent to the failed battery unit; a connecting sheet, used to connect the plurality of battery units in series, where the connecting sheet is provided with at least one breakage guide portion for guiding the connecting sheet to break and form a first part and a second part which are arranged separately, where the first part is used to be connected to the at least one unfailed battery unit and the second part is used to be connected to
(Continued)

the failed battery unit; and an electroconductive part, used to be connected to the first part.

13 Claims, 9 Drawing Sheets

(51) Int. Cl.
    *H01M 50/204* (2021.01)
    *H01M 50/249* (2021.01)
    *H01M 50/51* (2021.01)
    *H01M 50/528* (2021.01)

(52) U.S. Cl.
    CPC ......... *H01M 50/249* (2021.01); *H01M 50/51* (2021.01); *H01M 50/528* (2021.01); *H01M 2220/20* (2013.01)

(56) References Cited

U.S. PATENT DOCUMENTS

| | | | |
|---|---|---|---|
| 2017/0179713 A1 | 6/2017 | Bourns et al. | |
| 2021/0143518 A1 | 5/2021 | Zhou et al. | |

FOREIGN PATENT DOCUMENTS

| | | | |
|---|---|---|---|
| CN | 205264765 U | 5/2016 |
| CN | 205911353 U | 1/2017 |
| CN | 206076357 U | 4/2017 |
| CN | 107305938 A | 10/2017 |
| CN | 207068974 U | 3/2018 |
| CN | 108199099 A | 6/2018 |
| CN | 108701803 A | 10/2018 |
| CN | 110226246 A | 9/2019 |
| CN | 110323400 A | 10/2019 |
| CN | 112297847 A | 2/2021 |
| EP | 3846281 A1 | 7/2021 |
| JP | 2001292532 A | 10/2001 |
| JP | 2022522490 A | 4/2022 |
| KR | 20200040581 A | 4/2020 |
| WO | 2013018551 A1 | 2/2013 |

OTHER PUBLICATIONS

Machine translation of CN107305938A, Peng, (Year: 2016).*
Extended European Search Report dated May 17, 2022 received in European Patent Application No. EP 20922480.7.
First Office Action dated Jul. 12, 2022 received in Chinese Patent Application No. CN 202010261036.0.
Notice of Reasons for Refusal dated Aug. 14, 2023 received in Japanese Patent Application No. JP 2022-543718.
Second Office Action dated Jan. 13, 2023 received in Chinese Patent Application No. CN 202010261036.0.
Notice of Allowance issued Oct. 23, 2024 for Korean Patent Application No. 10-2022-7025685.

* cited by examiner

BATTERY MODULE, BATTERY PACK, DEVICE AND FAILURE PROCESSING METHOD

CROSS-REFERENCE TO RELATED APPLICATIONS

This application is a continuation of International Application No. PCT/CN2020/135948, filed on Dec. 11, 2020, which claims priority to Chinese Patent Application No. 202010261036.0, filed on Apr. 3, 2020. The disclosures of the aforementioned applications are hereby incorporated by reference in their entireties.

FIELD OF TECHNOLOGY

An embodiment of the present application relates to the field of energy storage devices, and more particularly, to a battery module, a battery pack, a device and a failure processing method.

BACKGROUND

A battery module includes a plurality of mutually stacked battery units, and the plurality of battery units are electrically connected, so that output of electric energy of the battery module is realized, and power is supplied for an electric device. When a certain battery unit is in failure, the whole circuit of the battery module is in failure, resulting in that the battery module cannot work normally.

SUMMARY

The present application provides a battery module, a battery pack, a device and a failure processing method. The battery module has few components, a simple structure and high energy density.

According to a first aspect of the embodiment of the present application, a battery module is provided. The battery module includes:
 a plurality of battery units for series connection, where after the battery module fails, the plurality of battery units include a failed battery unit and at least one unfailed battery unit adjacent to the failed battery unit;
 a connecting sheet, used to connect the plurality of battery units in series, where the connecting sheet is provided with at least one breakage guide portion for guiding the connecting sheet to break and form a first part and a second part which are arranged separately, the first part is used to be connected to the at least one unfailed battery unit and the second part is used to be connected to the failed battery unit;
 an electroconductive part, used to be connected to the first part, so that current bypasses the failed battery unit and the battery module resumes work.

In the embodiment of the present application, the connecting sheet is provided with the breakage guide portion, so that the connecting sheet is easier to break, thereby the unfailed battery unit can be conveniently disconnected from the failed battery unit, and the failure processing efficiency is improved. Meanwhile, when at least one unfailed battery unit is connected through the electroconductive part, a circuit of the battery module can be turned on again.

In a possible design, at least one unfailed battery unit includes two unfailed battery units adjacent to the failed battery unit; and the electroconductive part is used to be connected to the first parts of the two unfailed battery units.

The electroconductive part is used to be connected to the first part, so that the at least one unfailed battery unit is electrically connected through the electroconductive part, the current bypasses the failed battery unit, and the battery module resumes work.

In a possible design, when a plurality of breakage guide portions are provided, the plurality of breakage guide portions are spaced.

The plurality of breakage guide portions and the plurality of breakage connecting portions are mutually spaced, that is, a to-be-removed part is arranged between the adjacent breakage guide portions, and the to-be-removed part between the breakage guide portions can be removed when the breakage guide portions are all broken, thereby ensuring that the first part and the second part of the breakage connecting sheet are mutually connected and ensuring that the unfailed battery unit is not connected to the failed battery unit.

In a possible design, the breakage guide portion includes a bending portion.

After the bending portion is disconnected, the to-be-removed part can be removed, so that the first part and the second part of the breakage connecting sheet are mutually separated, and the disconnection of the unfailed battery unit and the failed battery unit is realized.

In a possible design, the bending portion is bent relative to the connecting sheet.

In a possible design, the breakage guide portion includes a weak portion.

Connection between the weak portion and other positions of the connecting sheet can be broken, and/or the weak portion can be broken.

In a possible design, the weak portion is recessed relative to the connecting sheet.

In a possible design, the weak portion includes a connecting portion; and the connecting portion is recessed relative to the connecting sheet along a height direction of the battery unit;
 the connecting portion can be disconnected from the connecting sheet.

One part of the connecting portion is disconnected from the connecting sheet, so that the connection strength between the weak portion and the connecting sheet is low, and the connecting sheet can be disconnected conveniently.

According to a second aspect of the embodiment of the present application, a battery pack is provided. The battery pack includes: the above battery module;
 a box body, used to accommodate the battery module.

According to a third aspect of the embodiment of the present application, a device is provided. The device includes: the above battery pack, where the battery pack is used to provide electric energy.

According to a fourth aspect of the embodiment of the present application, a failure processing method is provided and is used for processing a failed battery unit. At least one unfailed battery unit is adjacent to the failed battery unit, a connecting sheet is used to connect a plurality of battery units in series, and the connecting sheet is provided with at least one breakage guide portion;
 the failure processing method includes:
  connecting sheet connected to the unfailed battery unit is disconnected along the breakage guide portion to form a first part and a second part which are arranged separately, where the first part is used to be connected to at least one unfailed battery unit and the second part is used to be connected to the failed battery unit;

connecting the first part through the electroconductive part, so that current bypasses the failed battery unit and the battery module resumes work.

In a possible design, at least one unfailed battery unit includes two unfailed battery units adjacent to the failed battery;

when the first part is connected through the electroconductive part, the failure processing method includes:

connecting the first parts of the two unfailed battery units through the electroconductive part.

In a possible design, one breakage guide portion is provided. After the connecting sheet connected to the unfailed battery unit is broken along the breakage guide portion to form the first part and the second part, the failure processing method further includes:

removing a part of the connecting sheet connected to the failed battery unit.

The part of the connecting sheet connected to the failed battery unit is removed, and the second part connected to the failed battery unit can be removed, so that the breakage connecting sheet only includes the first part connected to the unfailed battery unit, and electric connection between the unfailed battery unit and the failed battery unit is ensured to be disconnected; moreover, after the part connected to the failed battery unit is removed, connection between the first part of the breakage connecting sheet and the electroconductive part can be realized conveniently, and the risk of interference with the electroconductive part in the connection process is reduced. In addition, after the second part is removed, the weight of the battery module can be reduced, and the energy density can be increased.

In a possible design, a plurality of breakage guide portions are provided, the plurality of breakage guide portions are spaced, and a to-be-removed part is arranged between the adjacent breakage guide portions;

when the connecting sheet connected to the unfailed battery unit is broken along the breakage guide portion to form the first part and the second part, the failure processing method further includes:

breaking the plurality of breakage guide portions and removing the to-be-removed part, so that first part and second part are mutually spaced.

The to-be-removed part is removed so as to ensure that the first part and the second part of the breakage connecting sheet are mutually connected and ensure that the unfailed battery unit is not connected to the failed battery unit. In addition, in the breakage connecting sheet, after the to-be-removed part is removed, a distance between the first part and the second part can be increased, so that an electrical gap between the two is increased, the two are prevented from being touched by mistake, and the safety of the battery module is improved.

In a possible design, before the first part is connected through the electroconductive part, the failure processing method includes:

placing a heat-insulating part between the breakage guide portion and a top cover of the corresponding failed battery unit;

when the first part is connected through the electroconductive part, the failure processing method includes:

welding the electroconductive part with the first part, so that the at least one unfailed battery unit is connected through the electroconductive part conveniently.

In the embodiments of the present application, the connecting sheet is provided with the breakage guide portion, so that the connecting sheet is easier to break, thereby the unfailed battery unit can be conveniently disconnected from the failed battery unit, and the failure processing efficiency is improved. Meanwhile, when the at least one unfailed battery unit is connected through the electroconductive part, a circuit of the battery module can be turned on again, and the circuit can bypass the failed battery unit, so that the failed battery unit does not participate in the charging and discharging process of the battery module any more, that is, the failed battery unit does not affect the circuit of the battery module.

It should be understood that the above general description and the following detailed description are exemplary only and cannot limit the present application.

BRIEF DESCRIPTION OF THE DRAWINGS

In order to describe the technical solutions in the embodiments of the present application more clearly, the following briefly introduces the drawings required for describing the embodiments of the present application. Apparently, the drawings in the following description show merely some embodiments of the present application, and an ordinary person of skill in the art may also derive other drawings from these drawings without creative efforts.

Figure 1:
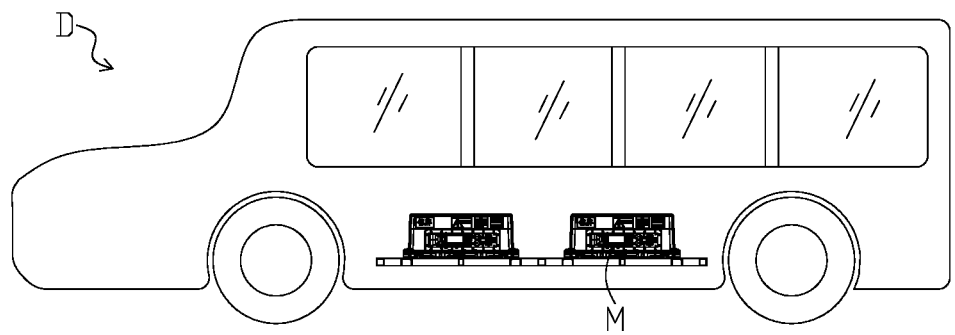
FIG. 1 is a structural schematic diagram of a device provided by an embodiment of the present application in a specific embodiment.

In the drawings, the drawings are not drawn according to an actual ratio.

REFERENCE NUMERALS

D—device;
M—battery pack;
M1—box body;
  M11—upper box body;
  M12—lower box body;
  M13—accommodating cavity;
  M2—battery module;

1—battery unit;
  11—electrode terminal;
    111—first electrode terminal;
    112—second electrode terminal;
  12—unfailed battery unit;
  13—failed battery unit;
  15—top cover;
2—connecting sheet;
  21—first connecting sheet;
  22—second connecting sheet;
  23—breakage connecting sheet;
  24—breakage guide portion;
    241—bending portion;
      241a—operating space;
    242—weak portion;
      242a—preset gap;
      242b—connecting portion;
  25—first part;
  26—second part;
  27—to-be-removed part;
3—electroconductive part;
4—heat-insulating part.

The drawings, which are incorporated in and constitute a part of this specification, illustrate embodiments consistent with the present application, and together with the description, serve to explain the principles of the present application.

DETAILED DESCRIPTION OF THE EMBODIMENTS

For better understanding of the technical solutions of the present application, the embodiments of the present application will be described below in detail with reference to the drawings.

It should be clear that the described embodiments are merely a part rather than all of the embodiments of the present application. All other embodiments obtained by an ordinary person of skill in the art based on the embodiments of the present application without creative efforts shall fall within the protection scope of the present application.

Terms used in the embodiments of the present application are only for describing specific embodiments, and are not intended to limit the present application. As used in the embodiments of the present application and the appended claims, the singular forms "a", "the" and "this" are intended to include the plural forms, unless the context clearly indicates other meanings.

It should be understood that the term "and/or" used herein merely describes an association relationship between associated objects, and it indicates three types of relationships. For example, A and/or B may indicate three conditions that A exists alone, A and B coexist, or B exists alone. In addition, the character "/" herein generally denote that the former and latter associated objects are in an "or" relationship.

It should be understood that azimuth words such as "upper", "lower", "left", "right" and the like described in the embodiment of the present application are described from the angle of the drawings, and should not be understood as a limitation of the embodiment of the present application. In addition, in the context, it should be understood that when it is mentioned that one component is connected "above" or "below" another component, the component can be directly connected "above" or "below" another component, and may be indirectly connected "above" or "below" another component through an intermediate component.

Azimuth words appearing the following description are all directions shown in the drawings, and do not limit a specific structure of the present application. In the description of the present application, it should also be noted that unless otherwise specified and limited, the terms "mounting", "connecting" and "connection" should be understood in a broad sense, for example, they may be fixed connection and may also be detachable connection or integrated connection; and they may be direction connection and may also be indirect connection through an intermediate medium. An ordinary person of skill in the art may understand specific meanings of the above-mentioned terms in the present application based on the specific situation.

The embodiment of the present application provides a device using a battery unit as a power supply, a battery pack and a battery module. The device may be a vehicle, a ship, a small airplane and other mobile devices. The device includes a power source, where the power source is used to provide a driving force for the device, and the power source may be configured as the battery module for providing electric energy to the device. The driving force of the device may all be electric energy, and may also include electric energy and other energy (for example, mechanical energy). The power source may be the battery module (or the battery pack). In addition, the device may also be a battery cabinet or other energy storage devices. The battery cabinet may include a plurality of battery modules (or battery packs), so that the battery cabinet can output electric energy. Therefore, any device which can use the battery unit as the power supply is within the protection scope of the present application.

As shown in FIG. 1, taking a vehicle as an example, the device D in the embodiment of the present application may be a new energy vehicle. The new energy vehicle may be a battery electric vehicle, and may also be a hybrid vehicle or an extended-range vehicle. The vehicle may include a battery pack M and a vehicle main body, where the battery pack M is arranged on the vehicle main body, the vehicle main body is further provided with a driving motor, the driving motor is electrically connected to the battery pack M, the battery pack M provides electric energy, and the driving motor is connected to wheels on the vehicle main body through a transmission mechanism so as to drive the vehicle to travel. Specifically, the battery pack M may be horizontally arranged at the bottom of the vehicle main body.

Figure 2:
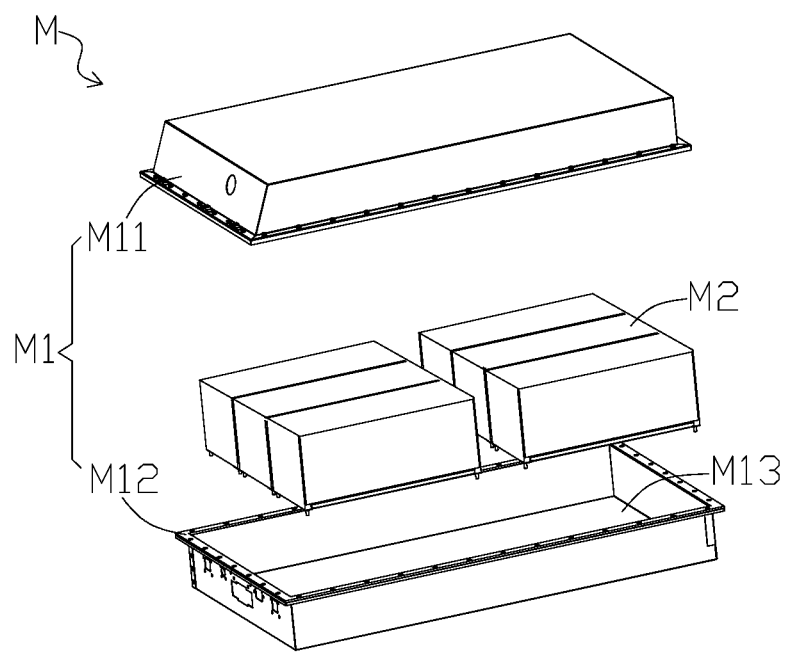
FIG. 2 is a structural schematic diagram of the battery pack in FIG. 1 in a specific embodiment.

As shown in FIG. 2, the battery pack M includes a box body M1 and the battery module M2 in the embodiment of the present application, where the box body M1 is provided with an accommodating cavity M13, the battery module M2 is accommodated in the accommodating cavity M13, there may be one or more battery modules M2, and a plurality of battery modules M2 are arranged in the accommodating cavity M13. The type of the box body M1 is not limited, and may be a frame-shaped box body, a disk-shaped box body, a box-shaped box body or the like. Specifically, as shown in FIG. 2, the box body M1 may include a lower box body M12 that accommodates the battery module M2, and an upper box body M11 that is closed with the lower box body M12.

It should be noted that the thickness direction X, length direction Y and height direction Z mentioned in this application are defined based on the battery unit, where the thickness direction X refers to the thickness direction of the battery unit, the height direction Z refers to the extending direction of the electrode terminal in the battery unit, and the length direction Y is vertical to the above thickness direction X and height direction Z (the three directions are approximately vertical), that is, the length direction Y is vertical to a plane formed by the thickness direction X and the height direction Z.

Figure 3:
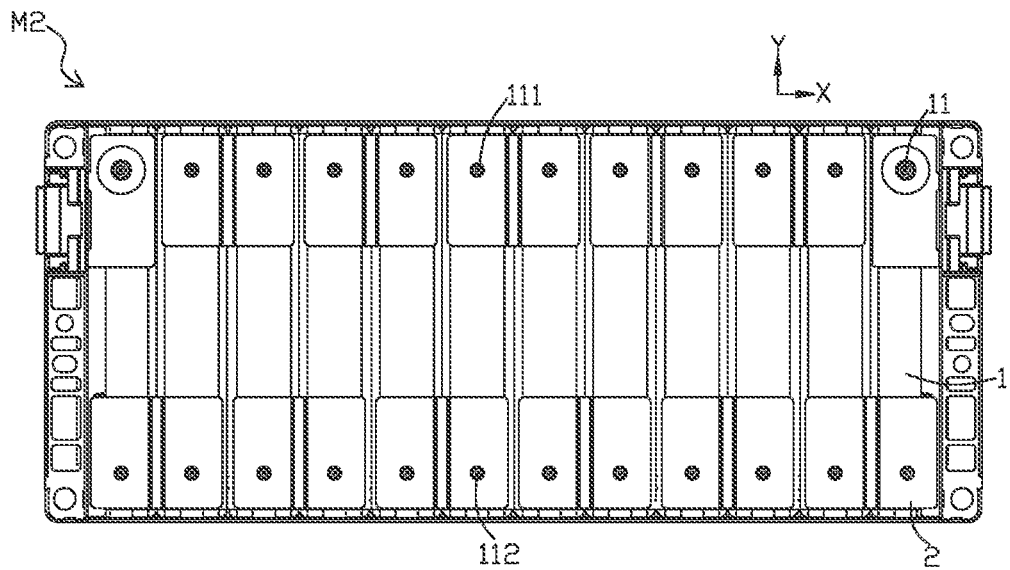
FIG. 3 is a top view of the battery module in FIG. 2 in a specific embodiment.

As shown in FIG. 3, the battery module M2 includes a plurality of battery units and a frame structure for fixing the battery units 1, where the plurality of battery units 1 may be mutually stacked along the thickness direction X. The frame structure may include an end plate, where the end plate is located at two end parts of the battery unit 1 along the thickness direction X and is used to limit the movement of the battery unit along the thickness direction X. Meanwhile, in a specific embodiment, the frame structure may further include side plates, where two side plates are located on two sides of the battery unit 1 along the length direction Y, and the side plates are connected to the end plate, so that the frame structure is formed. In another embodiment, the frame structure may not be provided with a side plate, the battery units 1 are connected through a first ribbon or through a first ribbon and a second ribbon after being stacked, and the end plate and the ribbons form the above frame structure. In addition, in a specific embodiment, the battery pack may include a box body and a plurality of battery units, where the box body is provided with an accommodating cavity; the plurality of battery units are located in the accommodating cavity and may be connected to the box body; and specifically, the battery units may adhere to an inner wall of the box body through adhesives.

In the working process of the battery module, each battery unit is continuously charged and discharged, and the battery unit is in failure (for example, abnormal attenuation of capacity), which leads to that the battery unit cannot work normally. Therefore, in this specification, the battery unit which is in failure and cannot work normally is defined as a failed battery unit, and the battery unit which is not in failure and can work normally is defined as an unfailed battery unit. At this time, the battery module or the battery pack has one or more failed battery units, which leads to that a circuit is in failure and cannot supply power normally, that is, the battery module or the battery pack is in failure. To solve the technical problem, the embodiment of the present application solves this technical problem by removing the failed battery unit from the circuit of the battery module and forming a circuit again.

It should be noted that the battery unit mentioned in the embodiment of the present application may include the following two situations. First, when the battery module is formed by connecting a plurality of battery cells in series, the battery unit in the embodiment of the present application may be a single battery cell, correspondingly, the failed battery unit may be one failed battery cell of the battery cells; and second, when the battery module includes at least one parallel group formed by connecting more than two battery cells in parallel, the battery unit in the embodiment of the present application may be one parallel group, correspondingly, the failed battery unit is one of the parallel groups, and the parallel group includes at least one failed battery cell.

In addition, the battery unit of the embodiment of the present application may be a soft package battery, or may also be a square battery or cylindrical battery or the like.

As shown in FIG. 3, an electrode terminal 11 of the battery unit 1 includes a first electrode terminal 111 and a second electrode terminal 112 with opposite polarities. The battery module M2 or the battery pack, the plurality of battery units 1 are electrically connected to form a circuit of the battery module M2 or the battery pack. The battery units 1 may be specifically connected in series, and the battery units 1 may be connected through the connecting sheet 2. For example, as shown in FIG. 4, when the battery units 1 are connected in series, the first electrode terminal 111 of the battery unit 1 located on the left side and the second electrode terminal 112 of the battery unit 1 located in the middle are connected through a first connecting sheet 21, and the first electrode terminal 111 of the battery unit 1 located in the middle and the second electrode terminal 112 of the battery unit 1 located on the right side are connected through a second connecting sheet 22, so that three battery units 1 are connected in series through the first connecting sheet 21 and the second connecting sheet 22.

Figure 4:
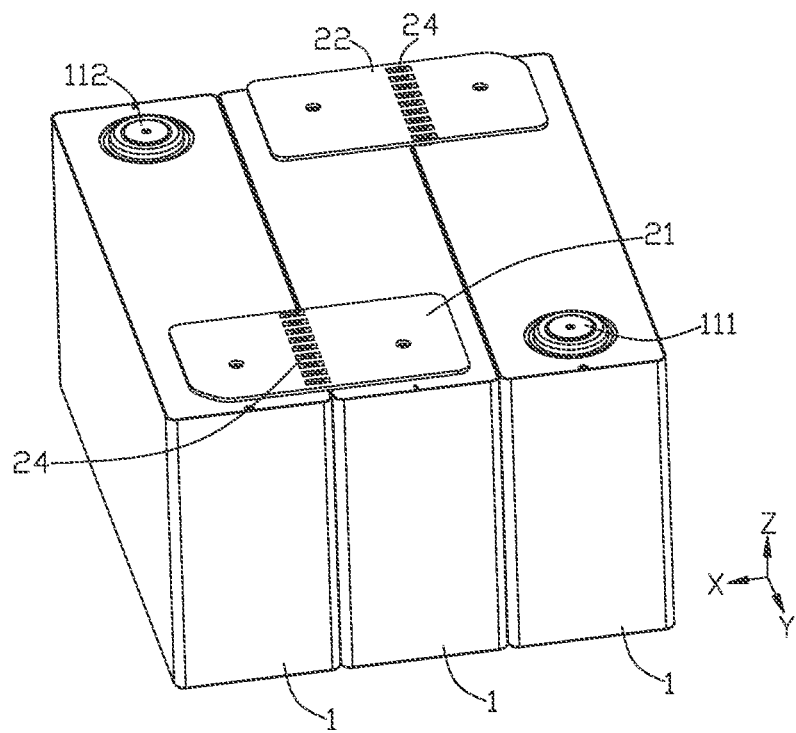
FIG. 4 is a partial structural schematic diagram of the battery module in FIG. 3 in a first specific embodiment.

In addition, as shown in FIG. 4, suppose current flows to the battery unit 1 located in the middle from the battery unit 1 located on the left side, and finally flows to the battery unit 1 located on the right side; and when the positions of the three are shown in FIG. 4, the three are adjacent. Moreover, the battery unit 1 on the left side is located at the upstream of the battery unit 1 located in the middle, and the battery unit 1 on the right side is located at the downstream of the battery unit 1 located in the middle.

Figure 5:
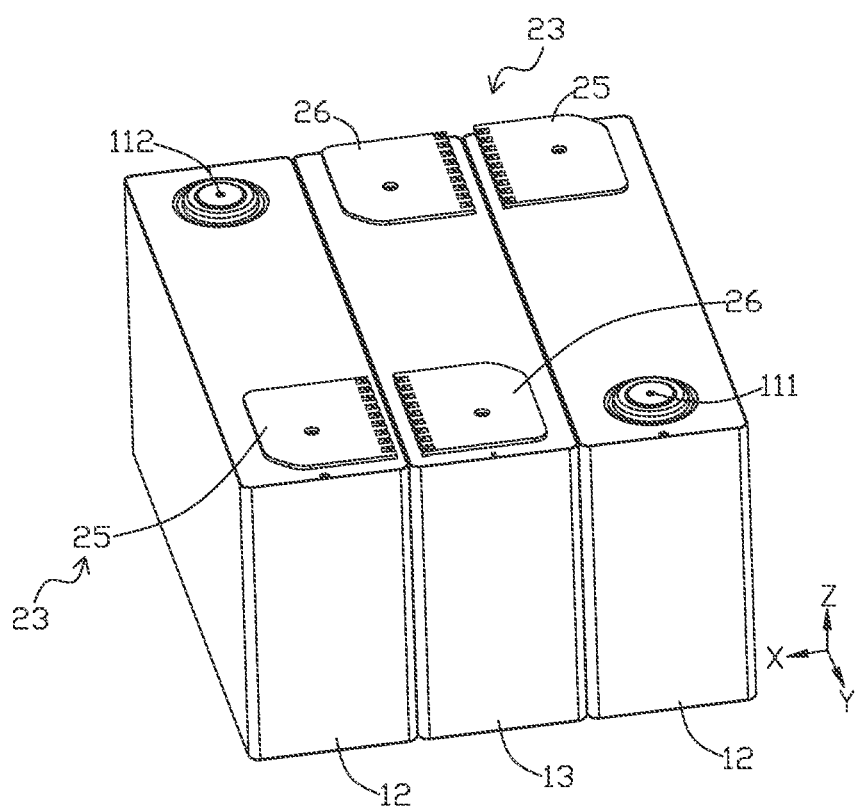
FIG. 5 is a structural schematic diagram when the breakage guide portion of the connecting sheet is broken in FIG. 4.

Specifically, as shown in FIG. 4, the connecting sheet 2 is provided with a breakage guide portion 24; moreover, when the battery unit located in the middle in FIG. 4 is in failure, as shown in FIG. 5, the plurality of battery units of the battery module include a failed battery unit 13 and at least one unfailed unit 12, where the unfailed battery unit 12 is a battery unit adjacent to the failed battery unit 13. The "adjacent" includes: the unfailed battery unit 12 is physically adjacent to the failed battery unit 13, that is, there is no other battery units between the two (there may be a heat-insulating pad, a butter pad and other structures between the two); and the unfailed battery unit 12 is electrically adjacent to the failed battery 13. The electrically adjacent refers to: the battery units connected to the same connecting sheet are electrically adjacent along a flowing direction of current, and when the battery units are electrically adjacent, there may be other battery units between the two battery units connected to the same connecting sheet, that is the connecting sheet spans at least one battery unit, and at this time, the two electrically adjacent battery units do not meet physically adjacent.

In the embodiment shown in FIG. 5, the breakage connecting sheet 23 formed after the breakage guide portion of the connecting sheet is broken includes a first part 25 and a second part 26, where the first part 25 is used to be connected to the unfailed battery unit 12, the second part 26 is used to be connected to the failed battery unit 13, and the first part 25 and the second part 26 are arranged separately (the two are not connected), so that electric connection between the unfailed battery unit 12 and the failed battery unit 13 of the battery module is disconnected.

Figure 6:
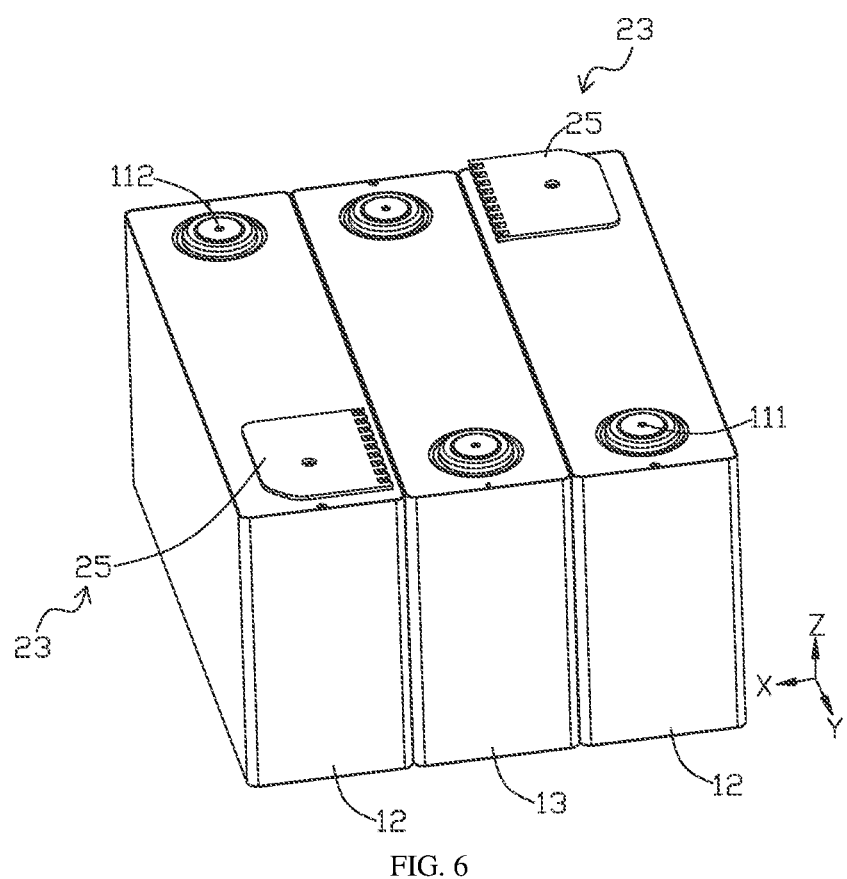
FIG. 6 is a structural schematic diagram that the second part is removed in FIG. 5.

Further, in the embodiment shown in FIG. 6, the breakage connecting sheet 23 formed after the breakage guide portion of the connecting sheet is broken only includes the first part 25, and the first part 25 is connected to the unfailed battery unit 12. In this embodiment, after the connecting sheet for connecting the failed battery unit 13 and the unfailed battery unit 12 is broken along the breakage guide portion, an operator can also remove the second part connected to the failed battery unit 13, so that the breakage connecting sheet only includes the first part 25 connected to the unfailed battery unit 12, and electric connection between the unfailed battery unit 12 and the failed battery unit 13 is ensured to be disconnected; moreover, after the part connected to the failed battery unit 13 is removed, connection between the first part 25 of the breakage connecting sheet 23 and the electroconductive part can be realized conveniently, and the risk of interference with the electroconductive part in the connection process is reduced. In addition, after the second part is removed, the weight of the battery module can be reduced, and the energy density can be increased.

Figure 7:
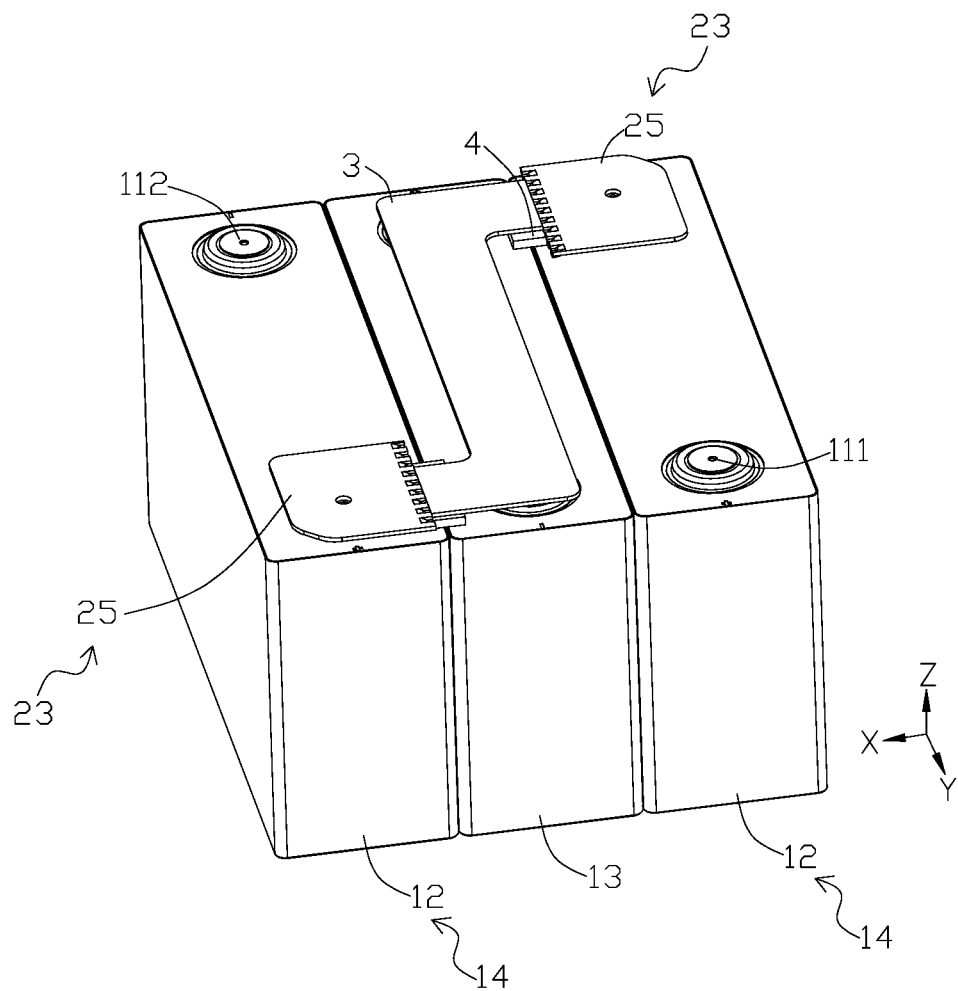
FIG. 7 is a structural schematic diagram that the first part is connected through the electroconductive part in FIG. 6.

Further, as shown in FIG. 7, the battery module further includes an electroconductive part 3, and the electroconductive part 3 is used to be connected to the first part 25, so that the at least one unfailed battery unit 12 is electrically connected through the electroconductive part 3, so that the current bypasses the failed battery unit 13, and the battery module resumes work.

In an existing design, when a certain battery unit in the battery pack is in failure, people can think of replacing the failed battery unit, or in order to accelerate the maintenance efficiency, the entire battery module is changed and maintained. Therefore, it is necessary to return the failed battery pack (the battery pack including the failed battery unit) to the factory to match the corresponding battery unit or battery module, or send the model of the corresponding battery unit or the model of the battery module to the manufacturer in the maintenance process. This process needs to consume a lot of time to wait, which is not beneficial to the optimization of resources.

The above processing mode accords with the processing mode in most fields, that is, the failure part or structure is changed, so that the overall structure resumes work. Therefore, at the maintenance points in most fields, samples will be prepared for parts that are prone to failure, and simple related detection devices will be prepared. If the parts that are not prone to failure are in failure or the parts that are not easy to store and place are in failure, the maintenance points need to transfer parts from the manufacturer before the parts are changed and maintained. In case of complicated maintenance methods, it is necessary to request technical support of the corresponding technicians from the manufacturer.

In the field of batteries, battery units account a large proportion in the failure parts of the battery pack, but there are many difficulties in preparing samples of the battery units. Meanwhile, the battery unit is not a part which can be placed for a long time for the following reasons: 1. at present, there are many models of battery units, which are different in size, capacity, chemical system, structure and so on; 2. the battery unit will discharge itself when being placed for a long time, so the longer the time, the capacity balance between the positive and negative terminals of the battery unit will be gradually broken and deepened; and 3. when the battery unit is placed for a long time, the decomposition reaction of electrolyte will accumulate some irreversible capacity losses. In addition, the requirement on the storage condition of the battery unit is high. If no attention is paid to the environmental factor, the self-discharging of the battery unit may be accelerated.

Even if there is no model problem, all the battery units adopt one structure, but if the battery units are reused after being stored for a long time, it is necessary to remeasure the capacity, self-discharging rate and other parameters of the battery units. However, there will not be such test conditions at the general maintenance points, the operator does not have the professional analysis capability; and the battery unit which has not be retested cannot ensure that the maintained battery pack can work normally. In addition, with the problem of the battery model, each maintenance point not only needs to store different models of battery units, but also needs to be equipped with related detection devices and the corresponding technicians. Therefore, it is difficult for the maintenance point to realize the above maintenance mode of changing the battery unit.

Therefore, at present, in order to improve the maintenance efficiency of the battery pack, the operator will change the failed battery module (the failed battery module refers to the battery module including the failed battery unit) in the battery pack, so that rapid maintenance can be realized by the mode. However, one battery module includes a plurality of battery units. In rare cases, all the battery units in one battery module are in failure; and under the normal conditions, only a small amount of battery units in one battery module are in failure (for example, only one battery unit is in failure), which will lead to that the battery module cannot work normally. At this time, changing the whole battery module will cause waste of resources.

Further, changing a new battery module will have a big problem in battery balance. During normal use, the capacity of the battery pack will be attenuated, and the capacity of the newly changed battery module will be inconsistent with that of the old battery module. According to the wooden barrel principle, the capacity of the battery pack depends on the battery module with the lowest capacity, so the newly changed battery module cannot play a good role in the structure; secondly, due to the attenuation of the capacity of the old battery module, the old battery module is fully charged and discharged every time, which will speed up the old battery module to reach the end of the service life; in addition, the internal resistance of the old battery module is greater than that of the newly changed battery module, and the same current flows through the old battery module and the newly changed battery module, and at this time, the old battery module with larger internal resistance generates more heat, that is, the temperature of the battery unit in the old battery module is higher, and the deterioration speed of the battery unit is increased, so that the internal resistance of the old battery module is further increased. Therefore, the internal resistance and the temperature rise of the battery module form a pair of negative feedback, so that deterioration of the battery unit with high internal resistance is accelerated.

On the other hand, for the circuit of the electric device, short circuit or open circuit is used to describe the circuit failure. At present, in the use of short circuit, the fuse is blown out mainly through short circuit, or the load of other test devices. However, no one will add an electroconductive part in the corresponding structure to short circuit the failed battery unit, which is considered to have great problems from simple cognition and cannot achieve the goal. However, in the entire battery module, one of the battery units is short circuited, which will not cause great change of the capacity, thereby ensuring normal use of the battery pack.

In the embodiment of the present application, as shown in FIG. 7, the above at least one unfailed battery unit 12 specifically may be two unfailed battery units 12. The two unfailed battery units 12 are connected through the electroconductive part 3, and the circuit of the battery module is turned on again. Moreover, the circuit can bypass the failed battery unit 13, so that the failed battery 13 does not participate in the charging and discharging process of the battery module any more, that is, the failed battery unit 13 does not affect the circuit of the battery module. Therefore, when there is one or more failed battery units 13 in the working process of the battery module, it is unnecessary to change the whole battery module. When the battery module is applied to the vehicle, the vehicle can be directly maintained in a 4S store without returning to the factory or without changing a new battery pack, so that the maintenance efficiency of the battery module is improved, and the maintenance flow and the maintenance cost are simplified. Meanwhile, after the above processing, in the battery module, only a small amount of battery cells (the battery cell of the failed battery unit 13) do not participate in the formation of the circuit and the battery capacity of the battery module is not greatly reduced, so that the battery module and the battery pack can work normally.

At the same time, for the structure that the battery unit adheres to the accommodating cavity of the box body through structural adhesive, when a certain battery unit is in failure, the operation of removing the failed battery unit from the accommodating cavity is not easy to realize, so the processing mode in this embodiment has the advantages of convenient operation and high efficiency.

In addition, in the embodiment of the present application, the connecting sheet is provided with the breakage guide portion, so that the connecting sheet is easier to break, the unfailed battery unit 12 can be more conveniently disconnected from the failed battery unit 13, and the failure processing efficiency is further improved. In addition, when the connecting sheet is provided with the breakage guide portion, deformation when the connecting sheet is broken can be reduced, and the fracture after disconnection is relatively flat, so that connection between the first part 25 of the breakage connecting sheet 23 and the electroconductive part 3 is realized, and the connection reliability between the two is improved.

In a possible design, the breakage guide portion specifically may include a bending portion and/or a weak portion, so the connecting sheet may include the bending portion and the weak portion at the same time. For example, when the connecting sheet includes two breakage guide portions, one of the two breakage guide portions may be the bending portion, and the other one may be the weak portion. Or the breakage guide portion of the connecting sheet may only include the weak portion, or may only include the bending portion. In a specific embodiment, as shown in FIG. 8, each connecting sheet 2 of the battery module includes one of the above breakage guide portions 24, and the breakage guide portion 24 may include a weak portion 242, where connection between the weak portion 242 and other positions of the connecting sheet 2 can be disconnected and/or the weak portion 242 can be disconnected.

Figure 8:
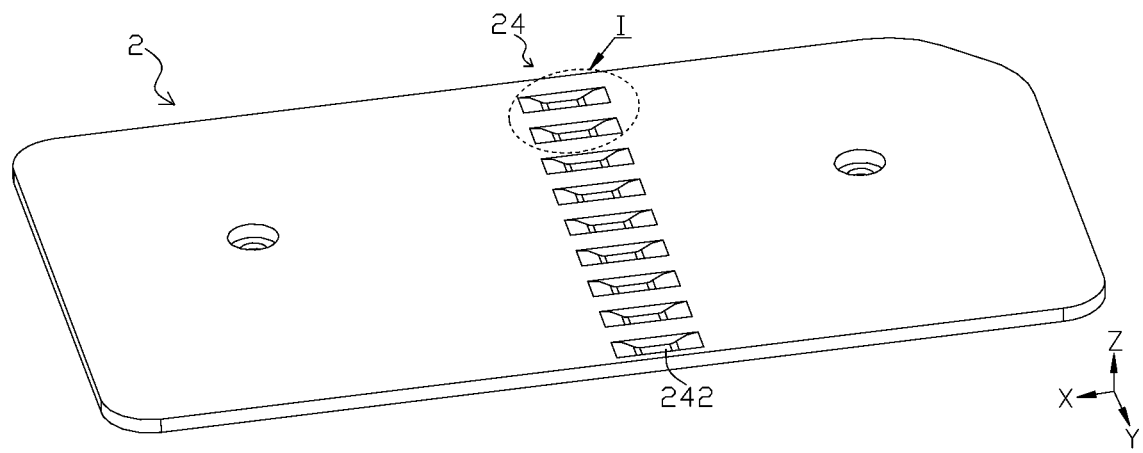
FIG. 8 is a structural schematic diagram of the connecting sheet in FIG. 4.

As shown in FIG. 8, the connecting sheet 2 may include one breakage guide portion 24, that is, may include one weak portion 242. The connecting sheet may further include a plurality of breakage guide portions.

Figure 9:
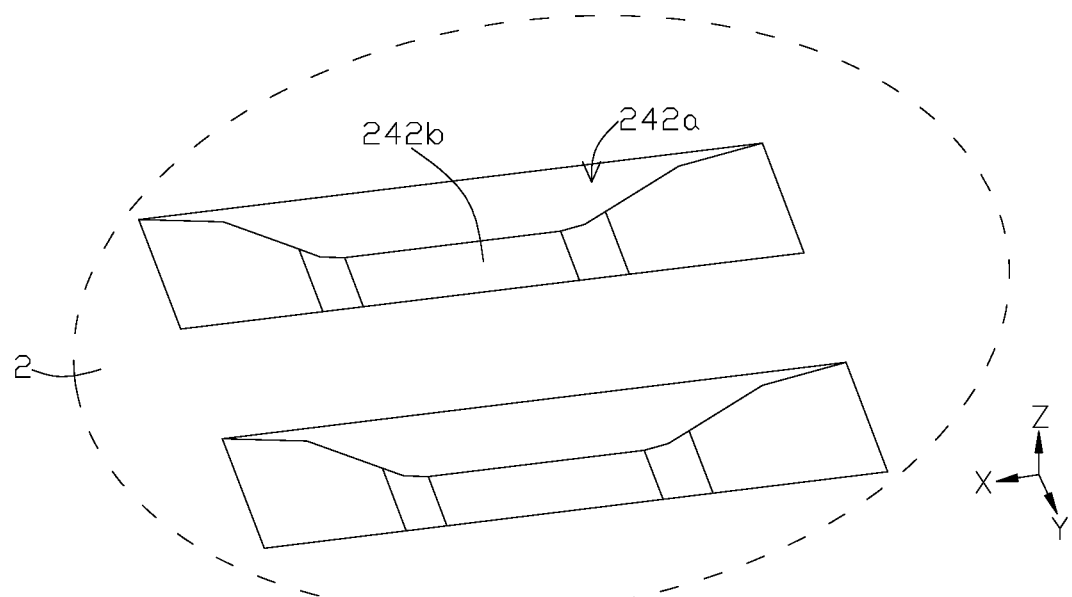
FIG. 9 is a partial enlarged diagram of the part I in FIG. 8.

Specifically, as shown in FIG. 9, in a first specific embodiment, the weak portion 242 may be of a recessed structure relative to the connecting sheet 2 along a height direction Z of the battery unit 1. Of course, the weak portion 242 may also be of other structures commonly used in this field, such as a break point, local thinning and the like.

Figure 10:
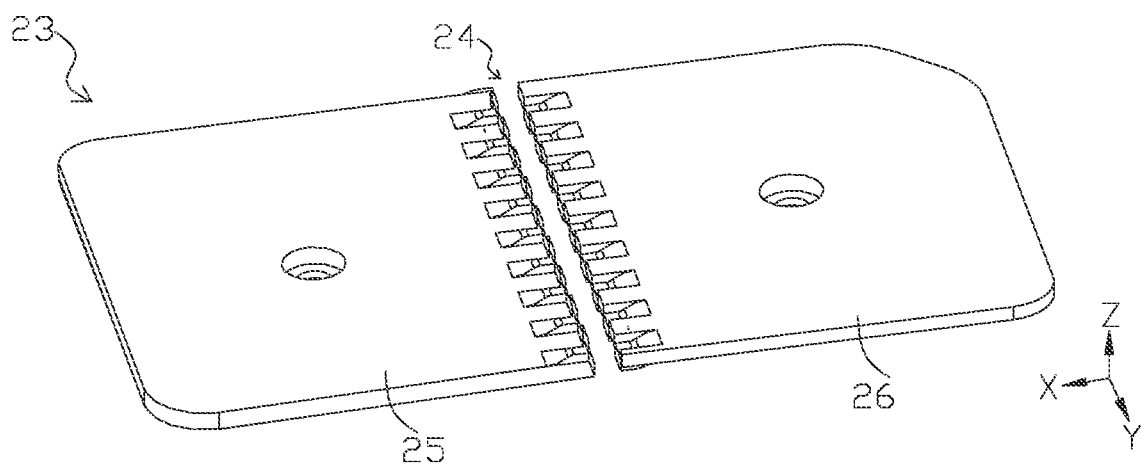
FIG. 10 is a structural schematic diagram of the breakage connecting sheet in FIG. 5.
Figure 11:
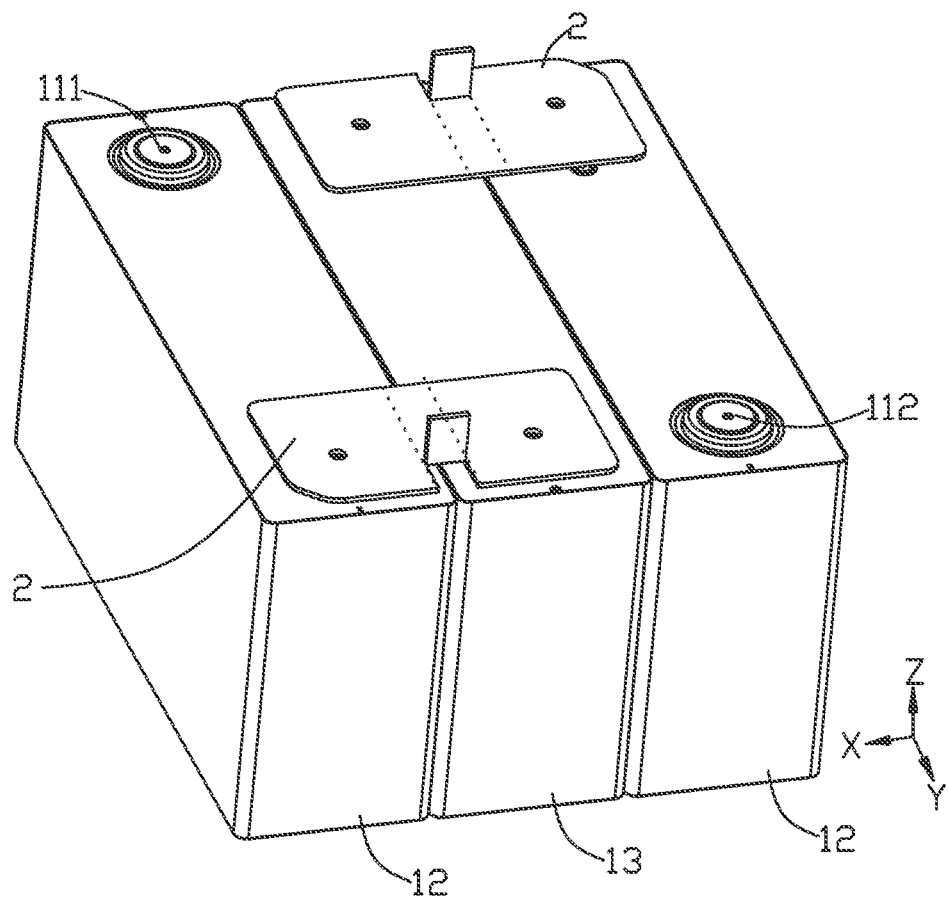
FIG. 11 is a partial structural schematic diagram of the battery module in FIG. 3 in a second specific embodiment.

In this embodiment, the connection strength between the weak portion 242 and the connecting sheet 2 is low, that is, the structure of the connecting sheet 2 at the position of the weak portion 242 is weak, connection between the weak portion 242 and the connecting sheet 2 and/or the weak portion 242 itself is easy to disconnect, so that the breakage connecting sheet 23 shown in FIG. 10 can be formed conveniently.

More specifically, as shown in FIG. 9, the weak portion 242 includes a connecting portion 242b, and the connecting portion 242b is recessed relative to the connecting sheet 2 along the height direction Z of the battery unit 1; meanwhile, one part of the connecting portion 242b is disconnected from the connecting sheet 2 and the other part of the connecting portion 242b is connected to the connecting sheet 2, and there is a preset gap 242a between the connecting portion 242b and the connecting sheet 2 along the height direction Z of the battery unit.

In this embodiment, one part of the connecting portion 242b is disconnected from the connecting sheet 2, so that the connection strength between the weak portion 242 and the connecting sheet 2 is low, and the connecting sheet 2 can be disconnected conveniently.

Therefore, when the breakage guide portion is disconnected to form the breakage connecting sheet 23, as shown in FIG. 10, the breakage connecting sheet 23 may include a first part 25 and a second part 26, and the first part 25 and the second part 26 are mutually spaced, where the first part 25 is used to be connected to the unfailed battery unit, the second part 26 is used to be connected to the failed battery unit, and when the first part 25 and the second part 26 are disconnected, connection between the unfailed battery unit and the failed battery unit can be disconnected.

In this embodiment, it may be unnecessary to remove the second part 26 connected to the failed battery unit, so that the maintenance step can be simplified. Meanwhile, redundant metal particles will be generated in the process of removing the second part 26; therefore, in this embodiment, the second part 26 is not removed, so that the risk of short circuit inside the battery module caused by the fact that the metal particles enter the battery module can be reduced.

The disconnection of the above breakage guide portion specifically may be realized by the following three modes: first, the connecting sheet 2 is broken by cutting along the weak portion 242 by a tool such as pliers; second, a heat-insulating part (such as a heat-insulating pad or a mica sheet) is placed between the weak portion 242 and the top cover of the corresponding failed battery unit along the height direction Z of the battery unit, then the connecting sheet is fused along the weak portion 242, and fusing may be realized by a tool such as a high-temperature welding gun (such as a tin welding gun); and third, a side leakage-preventing pad is placed below the to-be-disconnected connecting sheet, the periphery of the breakage guide portion is coated with glue, then the breakage guide portion of the connecting sheet is coated with a corrosion reagent, the side leakage-preventing pad and the glue can control the position of the corrosion reagent, and the breakage guide portion is corroded and penetrated through the corrosion reagent, so that the connecting sheet is broken.

Figure 12:
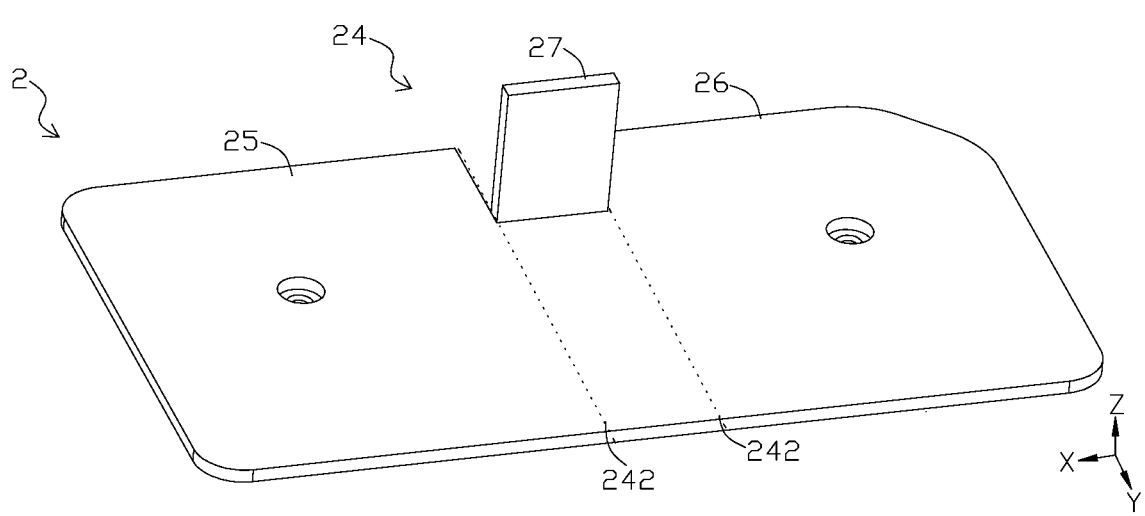
FIG. 12 is a structural schematic diagram of the connecting sheet in FIG. 10.
Figure 13:
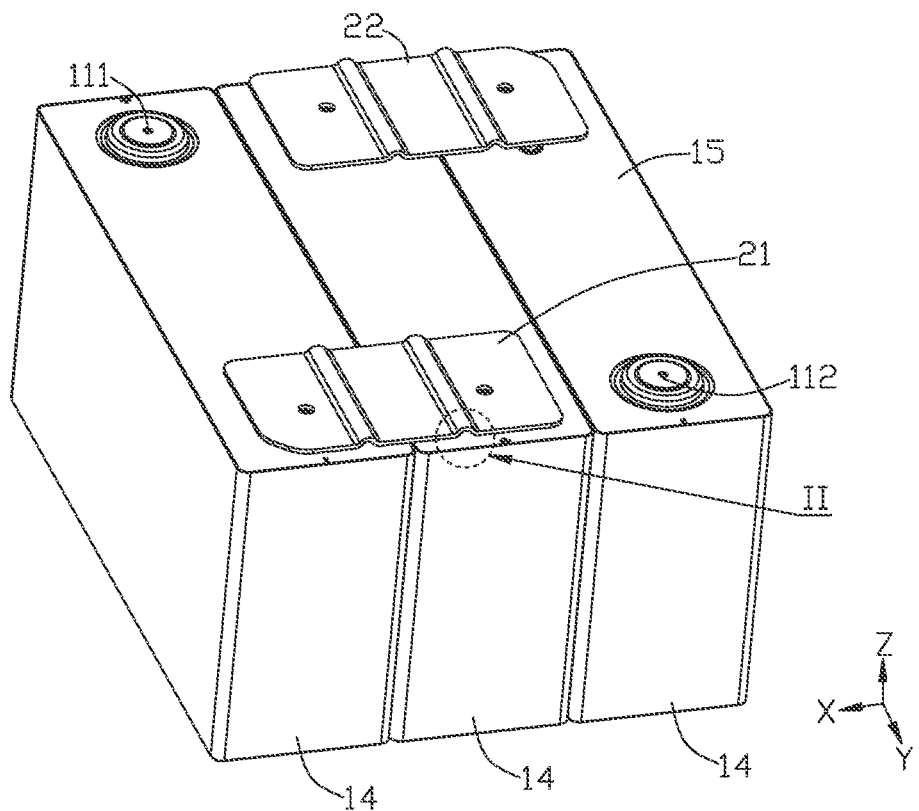
FIG. 13 is a partial structural schematic diagram of the battery module in FIG. 3 in a third specific embodiment.

In the above embodiments, the connecting sheet may include one breakage guide portion. In another specific embodiment, as shown in FIG. 12, the connecting sheet 2 may include a plurality of breakage guide portions 24. The plurality of breakage guide portions 24 are mutually spaced, that is, a to-be-removed part 27 is arranged between the adjacent breakage guide portions 24. When the breakage guide portions 24 are disconnected, the to-be-removed part 27 between the breakage guide portions 24 can be removed, thereby ensuring that the first part 25 and the second part 26 of the breakage connecting sheet are mutually connected, and ensuring that the unfailed battery unit is not connected to the failed battery unit.

In addition, in the breakage connecting sheet, after the to-be-removed part 27 is removed, a distance between the first part 25 and the second part 26 can be increased, so that an electrical gap between the two is increased, the two are prevented from being touched by mistake, and the safety of the battery module is improved.

In a specific embodiment, as shown in FIG. 12, the breakage guide portion 24 of the connecting sheet 2 specifically may include a plurality of weak portions 242, the plurality of weak portions 242 are mutually spaced, and a to-be-removed part 27 is arranged between two weak portions 242.

The weak portions 242 may be arranged along the length direction Y of the battery unit, that is, the breakage guide portion 24 may extend along the length direction Y of the battery unit, and the plurality of weak portions 242 may be arranged at intervals along the thickness direction X of the battery unit. After the weak portions 242 are disconnected, the breakage connecting sheet is formed, and at this time, the breakage connecting sheet includes a first part and a second part, where the first part is used to be connected to the unfailed battery unit and the second part is used to be connected to the failed battery unit. Moreover, after two or more weak portions 242 are disconnected, the above to-be-removed part 27 can be removed, so that the first part and the second part of the breakage connecting sheet are mutually separated, and the unfailed battery unit and the failed battery unit are disconnected.

More specifically, in the embodiment shown in FIG. 12, the weak portion 242 specifically may include a plurality of through holes arranged at the connecting sheet 2, and the plurality of through holes are spaced along the length direction Y of the battery unit to form the weak portion 242. In another specific embodiment, the weak portion specifically may include a connecting portion, and the connecting portion is recessed relative to the connecting sheet along the height direction Z of the battery unit. One part of the connecting portion is connected to the connecting sheet and the other part of the connecting portion is disconnected from the connecting sheet. Of course, in the embodiment of the present application, the weak portion 242 may also be of other structures commonly used in the field, such as a nick, as long as the breakage guide portion 24 can be disconnected conveniently.

Figure 14:
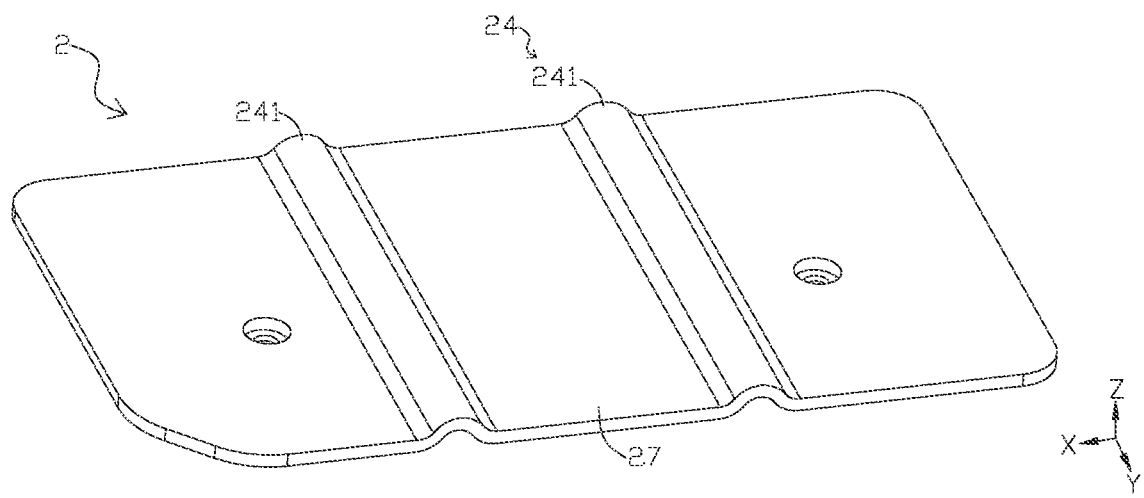
FIG. 14 is a structural schematic diagram of the connecting sheet in FIG. 13.

In another specific embodiment, as shown in FIG. 14, the breakage guide portion 24 specifically may be a bending portion 241, the bending portion 241 may extend along the length direction Y of the battery unit, and the connecting sheet 2 may include one or more bending portions 241. When the connecting sheet 2 includes a plurality of bending portions 241, the bending portions 241 are arranged at intervals, and a to-be-removed part 27 is arranged between the adjacent bending portions 241.

In the embodiment shown in FIG. 14, two bending portions 241 may be arranged at intervals along the thickness direction X of the battery unit. When the breakage guide portion 24 of the connecting sheet 2 is broken, the two bending portions 241 may be specifically disconnected to form the breakage connecting sheet, and at this time, the breakage connecting sheet includes the first part and the second part above, where the first part is used to be connected to the unfailed battery unit 12, and the second part is used to be connected to the failed battery unit 13. Moreover, after the two bending portions 241 are disconnected, the above to-be-removed part 27 can be removed, so that the first part and the second part of the breakage connecting sheet are mutually separated, and the disconnection of the unfailed battery unit and the failed battery unit is realized.

Figure 15:
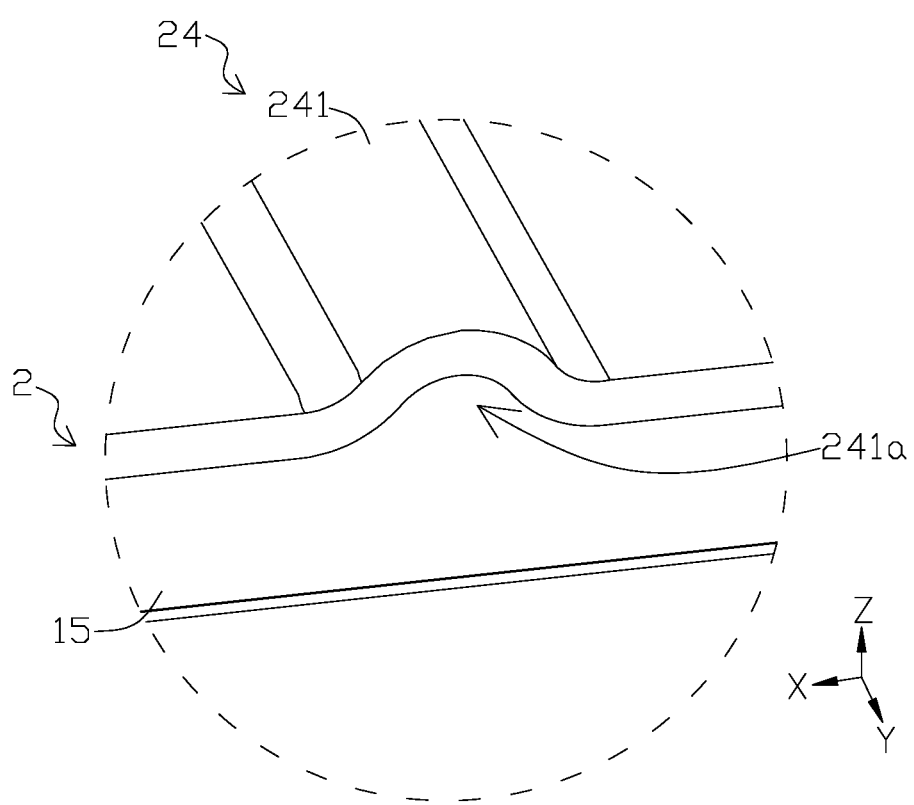
FIG. 15 is a partial structural diagram of the part II in FIG. 13.

Specifically, as shown in FIG. 15, the bending portion 241 is bent upwards along the height direction Z of the battery unit, that is, the bending portion 241 is bent along a direction away from the top cover 15, so that an operating space 241a is formed between the bending portion 241 and the top cover 15 along the height direction Z. The operating space 241a can be used for an operating tool (such as pliers) to stretch, so that the connecting sheet 2 is cut off along the bending portion 241. Of course, the bending portion 241 may also be disconnected through the above fusing, chemical corrosion and other modes.

In addition, the bending portion 241 may also be locally thinned so as to be disconnected along the bending portion 241.

In addition, the embodiment of the present application further provides a failure processing method, for processing the failed battery unit 13, where at least one unfailed battery unit 12 is adjacent to the failed battery unit 13, the connecting sheet 2 is used to connect a plurality of battery units 1 in series, and the connecting sheet 2 is provided with a breakage guide portion 24. Based on this, the failure processing method specifically includes:

S1: the connecting sheet 2 connected to the unfailed battery unit 12 is broken along the breakage guide portion 24 to form a breakage connecting sheet 23 including a first part 25 and a second part 26 which are arranged separately, where the first part 25 is used to be connected to at least one unfailed battery unit 12, and the second part 26 is used to be connected to the failed battery unit 13;

S3: the first part 25 is connected through an electroconductive part 3, so that current bypasses the failed battery unit 13 and the battery module resumes work.

In the embodiment of the present application, the connecting sheet 2 is provided with the breakage guide portion 24, so that the connecting sheet 2 is easier to break, the unfailed battery unit 12 and the failed battery unit 13 can be disconnected conveniently, and the failure processing efficiency is improved. Meanwhile, when the at least one unfailed battery unit 12 is connected through the electroconductive part 3, a circuit of the battery module can be turned on again, and the circuit can bypass the failed battery unit 13, so that the failed battery unit 13 does not participate in the charging and discharging process of the battery module any more, that is, the failed battery unit 13 does not affect the circuit of the battery module. Therefore, when there is one or more failed battery units 13 in the working process of the battery module, it is unnecessary to change the whole battery module. When the battery module is applied to the vehicle, the vehicle can be directly maintained in a 4S store without returning to the factory or without changing a new battery pack, so that the maintenance efficiency of the battery module is improved, and the maintenance flow and the maintenance cost are simplified.

The step S1 specifically may be as follows:

S11: the connecting sheet 2 is cut off by a tool along the breakage guide portion 24.

or the step S1 specifically may be as follows:

S12: a heat-insulating part is placed between the breakage guide portion 242 and a top cover 15 of the battery unit 1, and then the connecting sheet 2 is fused along the breakage guide portion 242.

Or the step S1 may further be as follows:

S13: a side leakage-preventing pad is placed below the connecting sheet 2, a periphery of the breakage guide portion 24 is coated with glue, then the breakage guide portion 24 of the connecting sheet 2 is coated with a corrosion reagent, and the breakage guide portion 24 is corroded and penetrated by the corrosion reagent, so that the connecting sheet 2 is broken.

In a possible design, at least one unfailed battery unit 12 includes two unfailed battery units 12 adjacent to the failed battery unit 13. Based on this, the step S3 specifically may include:

S31: the first parts 25 of the two unfailed battery units 12 are connected through the electroconductive part 3.

In this embodiment, current of the battery module can flow through the two unfailed battery units 12 and the electroconductive part 3, so that the battery module resumes work.

In a specific embodiment, the connecting sheet 2 may include one breakage guide portion 24. Therefore, after the step S1, the failure processing method may further include:

S21: a part of the connecting sheet 2 connected to the failed battery unit 13 is removed to form the breakage connecting sheet 23.

In this embodiment, when the part of the connecting sheet 2 connected to the failed battery unit 13 is removed, electric connection between the failed battery unit 13 and the unfailed battery unit 12 can be ensured to be disconnected; moreover, after the part connected to the failed battery unit 13 is removed, the first part 25 of the breakage connecting sheet 23 can be connected to the electroconductive part conveniently, and the risk of interference with the electroconductive part in the connection process is reduced. In addition, after the second part is removed, the weight of the battery module can be reduced, and the energy density can be increased.

In another specific embodiment, the connecting sheet 2 may further include a plurality of breakage guide portions 24 which are arranged at intervals, and a to-be-removed part 27 is arranged between the adjacent breakage guide portions 24. Based on this, the step S1 specifically may include:

S14: the breakage guide portion 24 is broken and the to-be-removed part 27 is removed to form the breakage connecting sheet 23. The breakage connecting sheet 23 includes a first part 25 and a second part 26, where the first part 25 is used to be connected to the unfailed battery unit 12, and the second part 26 is used to be connected to the failed battery unit 13.

In this embodiment, the connecting sheet 2 is provided with a plurality of breakage guide portions 24, so that the to-be-removed parts 27 among the plurality of breakage guide portions 24 can be removed after the plurality of breakage guide portions 24 are all disconnected, the first part and the second part of the breakage connecting sheet are ensured to be mutually spaced, and the connection between the unfailed battery unit and the failed battery unit is ensured to be disconnected. In addition, in the breakage connecting sheet, after the to-be-removed part 27 is removed, a distance between the first part 25 and the second part 26 can be increased, so that the first part and the second part are prevented from being touched by mistake, and the safety of the battery module is improved.

Specifically, before the step S3, the failure processing method may further include:

S23: a heat-insulating part 4 is placed between the breakage guide portion 24 and a top cover 15 of the corresponding failed battery unit 13 along the height direction Z of the battery unit 1, where the heat-insulating part 4 specifically may be a mica plate or a heat-insulating pad.

The step S3 specifically may be as follows:

S31: the electroconductive part 3 is welded with two first parts 25, so that the two unfailed battery units 12 are connected through the electroconductive part 3.

In this embodiment, the electroconductive part 3 and the first part 25 may be connected through other connection modes, such as bonding, clamping, connection through electroconductive adhesive and the like.

Although the present application has been described with reference to the optional embodiments, various improvements may be made and components therein may be replaced with equivalents without departing from the scope of the present application. In particular, as long as there is no structural conflict, the technical features in the embodiments can be combined in any way. The present application is not limited to the specific embodiments disclosed herein, but shall include all technical solutions falling within the scope of the claims.

What is claimed is:

1. A battery module, comprising:
    a plurality of battery units for series connection, wherein after the battery module fails, the plurality of battery units comprise a failed battery unit and at least one unfailed battery unit adjacent to the failed battery unit;
    a connecting sheet, configured to connect the plurality of battery units in series, wherein the connecting sheet is provided with at least one breakage guide portion configured for guiding the connecting sheet to break and form a first part and a second part which are arranged separately, the first part is configured to be connected to the at least one unfailed battery unit, and the second part is configured to be connected to the failed battery unit; and
    an electroconductive part, wherein two ends of electroconductive part are each connected to the first part of the connecting sheet which is connected to the failed battery unit and one of the at least one unfailed battery unit adjacent to the failed battery unit, so that current bypasses the failed battery unit and the battery module resumes work.

2. The battery module according to claim 1, wherein the at least one unfailed battery unit comprises two unfailed battery units adjacent to the failed battery unit, and the electroconductive part is configured to be connected to the first parts of the two unfailed battery units.

3. The battery module according to claim 2, wherein when a plurality of breakage guide portions is provided, the plurality of breakage guide portions is spaced.

4. The battery module according to claim 2, wherein the breakage guide portion comprises a bending portion.

5. The battery module according to claim 2, wherein the breakage guide portion comprises a weak portion.

6. The battery module according to claim 1, wherein when a plurality of breakage guide portions is provided, the plurality of breakage guide portions is spaced.

7. The battery module according to claim 1, wherein the breakage guide portion comprises a bending portion.

8. The battery module according to claim 7, wherein the bending portion is bent relative to the connecting sheet.

9. The battery module according to claim 1, wherein the breakage guide portion comprises a weak portion.

10. The battery module according to claim 9, wherein the weak portion is recessed relative to the connecting sheet.

11. The battery module according to claim 10, wherein the weak portion comprises a connecting portion, and the connecting portion is recessed relative to the connecting sheet along a height direction of the battery unit; and
    the connecting portion is configured to be disconnected from the connecting sheet.

12. A battery pack, comprising:
    a battery module, comprising:

a plurality of battery units for series connection, wherein after the battery module fails, the plurality of battery units comprise a failed battery unit and at least one unfailed battery unit adjacent to the failed battery unit;

a connecting sheet, used to connect the plurality of battery units in series, wherein the connecting sheet is provided with at least one breakage guide portion for guiding the connecting sheet to break and form a first part and a second part which are arranged separately, the first part is used to be connected to the at least one unfailed battery unit, and the second part is used to be connected to the failed battery unit; and an electroconductive part, wherein two ends of electroconductive part are each connected to the first part of the connecting sheet which is connected to the failed battery unit and one of the at least one unfailed battery unit adjacent to the failed battery unit, so that current bypasses the failed battery unit and the battery module resumes work; and a box body, configured to accommodate the battery module.

13. A device, comprising: the battery pack according to claim 12, wherein the battery pack is configured to provide electric energy.

\* \* \* \* \*